United States Patent [19]

Laederach-Zaugg

[11] Patent Number: 4,686,036
[45] Date of Patent: Aug. 11, 1987

[54] DEVICE FOR OZONIZING A FLUID

[76] Inventor: Barbara Laederach-Zaugg, Kranichweg 30, CH-3074 Muri, Switzerland

[21] Appl. No.: 828,695

[22] Filed: Feb. 12, 1986

Related U.S. Application Data

[63] Continuation-in-part of Ser. No. 706,851, Jan. 31, 1985, abandoned.

[30] Foreign Application Priority Data

Jun. 15, 1984 [WO] PCT Int'l Appl. .................. PCT/CH84/00097

[51] Int. Cl.⁴ ............................................. C02F 1/78
[52] U.S. Cl. .................................... 210/177; 210/192
[58] Field of Search ............... 210/192, 177, 180, 181, 210/748, 760; 422/24

[56] References Cited

U.S. PATENT DOCUMENTS

| | | | |
|---|---|---|---|
| 4,090,960 | 5/1978 | Cooper | 210/192 X |
| 4,141,830 | 2/1978 | Last | 210/760 X |
| 4,252,654 | 2/1981 | Leitzke et al. | 210/760 |
| 4,273,660 | 6/1981 | Beitzel | 210/192 X |
| 4,274,970 | 6/1981 | Beitzel | 210/192 X |

FOREIGN PATENT DOCUMENTS 1117 of 1910 United Kingdom .

Primary Examiner—Tom Wyse
Attorney, Agent, or Firm—Walter F. Wessendorf, Jr.

[57] ABSTRACT

Disclosed is a device comprising an ozonizer (1) in the first region (1') of which container (1) ozone is formed which is dispersed into fluid by a gas feed organ (3). The thusly formed two-phase mixture flows through a second region (1") of the ozonizer (1) to a phase separating element (13). Through the arrangement and disposition of the gas feed organ (3) on the fluid entry side, the second region (1") forms and defines a flow region for the two-phase mixture resulting in the greatest possible ozone feed into the fluid. Such devices have especial application for the sterilization of drinking and bath water.

4 Claims, 1 Drawing Figure

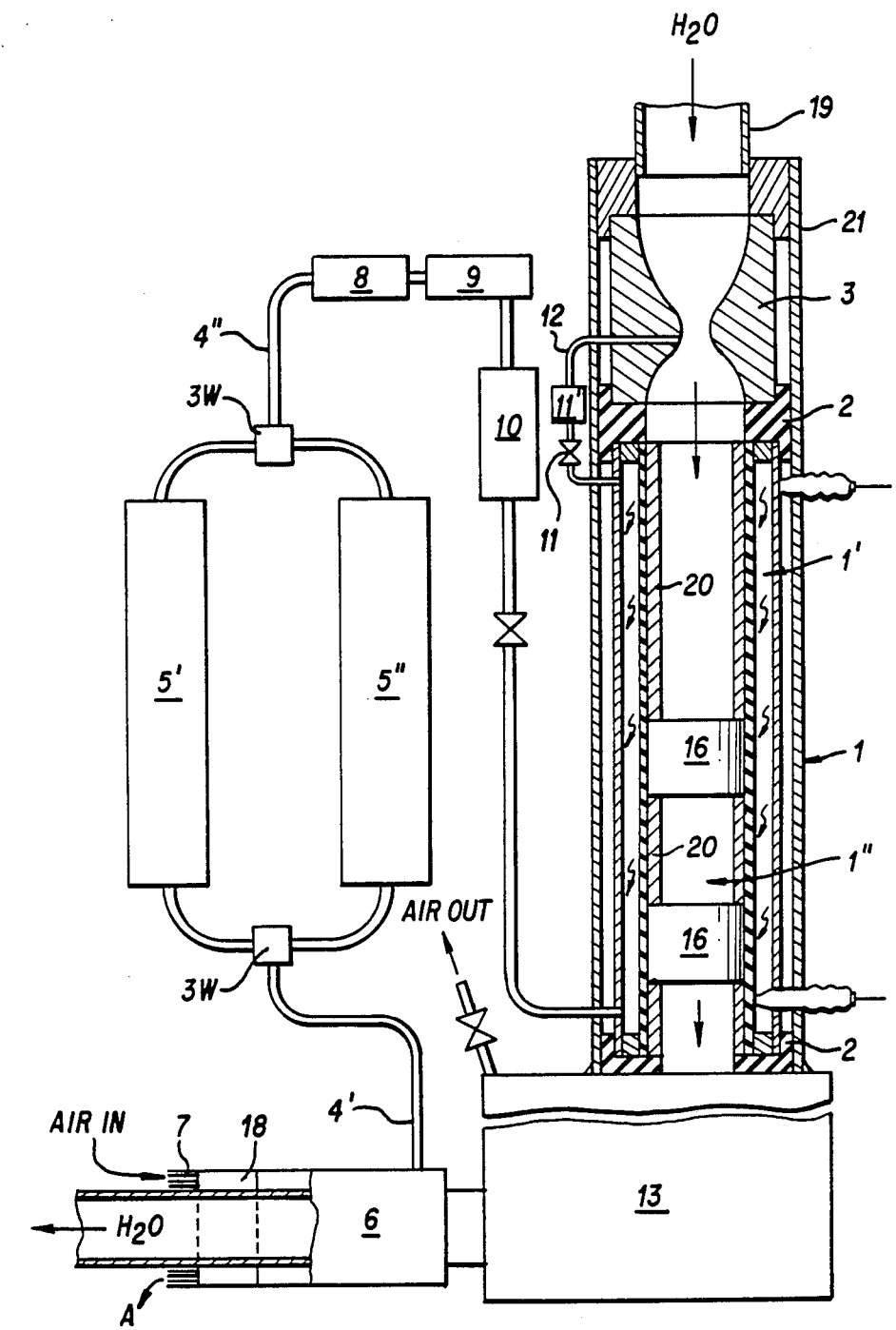

DEVICE FOR OZONIZING A FLUID

REFERENCE TO FIRST APPLICATION

This application is a continuation-in-part of the U.S. national application Ser. No. 706,852 now abandoned, which was deposited Jan. 31, 1985 based upon PCT/CH84/00097, filed June 15, 1984, claiming priority from Swiss application No. 3352/83-6 which was filed June 20, 1983.

BACKGROUND OF THE INVENTION

The present invention relates to a device for ozonizing of a fluid with an ozonizer which has a first region in which ozone bearing gas can be produced from oxygen bearing gas. The ozonizer has a second region which is formed as a flow channel for flow of the fluid therethrough. The first and second regions are connected in communicative relationship by at least one connecting channel whose inlet side communicates with the first region and whose outlet side communicates via a gas feed organ closing the upper part of the first region but communicating with the second region to thereby disperse the ozone bearing gas in the fluid for flow through the flow channel of the second region.

The term fluid is understood to mean a pure liquid, a liquid mixture or a polyphase mixture with a liquid as a continuous phase (e.g., a suspension or an emulsion).

Ozone is one of the strongest oxidants. In particular, ozone is used for the treatment of drinking, use and bathing water, as well as being used in the chemical industry.

There are several ozone-producing devices known and used today, and which are, to a large extent, identical in their basic constructions. Each of such devices usually has a gas treatment unit in the form of one or several driers, an ozonizer and a mixing system for feeding the ozone into the fluid. The elements of such devices are usually spatially separated and are coupled with one another by a channelized system.

Such devices assure an operationally safe production of ozone, but do not guarantee an optimal, i.e., as complete as possible, feed of the ozone formed in the ozonizer from the gas into the fluid phase for the following reasons:

1. Due to the known decay reaction of ozone, a part of the ozone already formed decays during transportation from the ozonizer to the gas feed organ into oxygen.

2. The gas feed organ which is spatially separated from the ozonizer is often built into a constructionally favorable, i.e., easily accesible, part in the fluid duct. However, such construction does not ensure that a two-phase flow form favorable for the gas-liquid exchange of matter.

3. The parameters characterizing the fluid flow in the channel (flow rate, intensity of turbulence) often do not ensure an optimal two-phase flow form because they were determined through consideration of other criteria (e.g., minimal pressure loss, low-noise flow).

The problem in the art is the need for a device for ozonizing a fluid that does not have the above-mentioned problems and drawbacks. In particular, such a device should ensure as high as possible ozone feed into the fluid, independent of the fluid channelization system or the flow parameters prevailing therein, respectively. The described problem in the art is solved by arranging and disposing the gas feed organ in front of the ozonizer as viewed in the direction of the flow of the fluid.

Such arrangement and disposition of the gas feed organ on the fluid entry side of the ozonizer has the following advantages:

1. The path of the ozone-bearing gas from the first region of the ozonizer (i.e., ozone production location) to the gas feed organ is short with the result that the total amount of ozone produced therefore acts as an oxidant in the fluid.

2. The two-phase mixture of ozone-bearing gas and fluid formed in the gas producing organ flows from the gas producing organ into a second region of the ozonizer. Within the ozonizer, it is therefore subjected to controlled flow conditions. Due to the known close relation between current and material exchange in two-phase mixtures, the exchange of matter (ozone feed into the fluid) is thereby also controlled.

3. Within the ozonizer the two-phase flow parameters can be varied alone by dimensioning the second region in a wide range and without having to thereby consider the channelization system or the corresponding flow parameters, respectively.

4. Ozonizer and gas feed organ from a constructional unit which can be integrated without large expenditure in already existing channelization systems.

The reaction heat generated in the first region of the ozonizer is directly conducted away by the fluid. Expensive and costly additional cooling installations are not needed.

In one embodiment it is proposed to arrange means for the redispersing of the two-phase mixture formed in the gas feed organ within the second region of the ozonizer. This measure recommends itself especially then if the two-phase mixture shows a not neglectable tendency to coalesce. As means can serve e.g. static mixing elements, a punched plate or gauze wire packages. But it is also possible to use dynamically working means, such as propellers or vibro-mixers.

In another embodiment it is proposed to arrange a phase separating element directly at the fluid exit of the ozonizer, e.g., a cyclone separator or a bend pipe or a separator. This measure results in a compact device that does not strain the fluid channelization system with gas which is especially advantageous in the case of centrifugal pumps connected at the outlet side. But it is also possible to arrange an intermediate piece, e.g., a tube equipped with or without additional dispersive means, between the ozonizer and the phase separating element.

In order to obviate the problem of water condensing out of the gas to be ionized in the first region of the ozonizer, it is proposed in a further embodiment to cool the gas through the fluid in a heat exchange device.

If further drying of the gas is desired for technical reasons of ozone production, the thus treated gas can be after-dried in a drier connected at the outlet side of the heat exchange device, e.g., in a columnar drier filled with silica gel or on a cooled surface (e.g., Peltier element).

The treated gas is then fed preferably through a throughput control device and a humidity meter into the first region of the ozonizer.

A mixer shaped in the form of a venturi valve is practically used as a gas feed organ. Such elements are known. Due to the underpressure produced by the flowing fluid in the venturi valve, the gas to be ozonized is sucked through the drier and ozonizer without additional feed elements.

BRIEF DESCRIPTION OF THE DRAWING

The preferred embodiment of the invention is shown in detail in the drawing.

DESCRIPTION OF THE PREFERRED EMBODIMENT

The ozonizer 1 has a second region 1″ through which the fluid can flow, formed by a glass tube metallized on its outside. The second region 1″ is surrounded by a ring slot-shaped first region 1′ formed by a metallic tube. On the fluid entry side, a venturi valve-like gas entry organ 3 is arranged on the side of said tube. On the fluid exit side, this tube is connected with a phase separating element 13 formed as a cyclone separator.

It is practical to connect the ozonizer and gas feed organ or phase separating element, respectively, by coupling and/or intermediate pieces 2.

In the second region 1″, two static mixing elements 16 are arranged. By means of capsules 20, the cross-section of the passage is adjustable with respect to favorable flow conditions. Such capsules 20 can serve as supporting elements for the static mixing elements 16 and are preferably designed as exchangeable parts. The tube-like housing 21 serves as contact protection and increases the mechanical strength of the combination of the gas feed organ and ozonizer at the same time. Insulators penetrate the housing 21 in a sealed way to bring the necessary voltage into the first region 1′, in which sparking or electrical discharge occurs to ozonize the air.

The gas to be ozonized, here air, is sucked by the underpressure created in the venturi valve 3 from the surroundings through a dust filter 7 into the heat exchanger 6. Heat exchanger 6 is designed as a double-pipe exchanger in which a fluid flows in the central pipe and thereby cools the air flowing in the ring slot. In order that the outer pipe also functions as a cooling surface, it is connected through a supporting plate 18 with the inner pipe.

During cooling, the water vapor of the air condenses until the condensation point corresponding to the fluid temperature is reached. The condensate subsequently flows out of the heat exchanger in the direction indicated by the arrow A.

The thus predried air flows through a channel 4′ and a changeover valve 3W into one of the two silica-gel filled drier columns 5′ or 5″, respectively.

These drier columns 5′ and 5″ are regenerated on a push-pull basis. A continuous production of ozone can thus be ensured. But it is also possible to use only one drier column whereby the production of ozone is interrupted during its regeneration. The dried air then flows through channel 4″, a humidity meter 8, a pressure measuring station 9 and a flow meter 10 (e.g., in the form of a rotameter) into the first region 1′ of the ozonizer 1.

In the first region 1′ of the ozonizer 1, the oxygen of the air is ozonized by electrical spark discharge between the metallic outer layer of the inner glass tube and the metallic tube surrounding it. The thus formed ozone flows through a connecting channel 12 into the venturi valve 3. In channel 12, a closure valve 11 is disposed which can be actuated by signals from the humidity meter 8, the pressure-measuring station 9 and the flow meter 10. Such measure prevents an influx of fluid into the first region 1′. In place of or with the closure valve 11, a one-way valve 11′ can be used.

It should be appreciated that such an ozonizing device can be installed without great expense on already existing fluid channels. If the original fluid flow parameters do not allow optimal two-phase flow with respect to the ozone feed, the flow cross-section of the second region 1″ can be varied by insertion of the capsules 20 with the fluid dynamics of the ozonizer improved thereby.

Having thusly described my invention, I claim:

1. A device for ozonizing a fluid comprising a venturi-tube (3), an ozonizer (1), a connecting channel (12), a phase separating element (13) and heat exchanger (6) and in which device the fluid flows downwardly through the venturi-tube (3), then downwardly through the ozonizer (1), exits therefrom into and through the separating element (13) and then through and out of heat exchanger (6); said venturi-tube (3) being arranged and disposed above and before said ozonizer (1) in the downward direction of flow of the fluid, said ozonizer (1) comprising a first region (1′) and a second region (1″) of concentrically arranged and disposed tubes, said ozonizer (1) and venturi-tube (3) defining by their described arrangement and disposition a common cylindrical housing, said first region (1′) having electrical discharge means to produce ozone bearing gas from oxygen bearing gas, said second region (1″) being centrally disposed relative to the longitudinal axis of said common cylindrical housing and being the flow channel for the flow relative to its longitudinal axis of the fluid therethrough, said venturi-tube (3) having a narrowest part, said venturi-tube (3) being directly connected to the upper end of said first region (1′) and closing said upper end, said venturi-tube (3) communicating with said second region (1″), said connecting channel (12) having an inlet side and an outlet side, said inlet side of said connecting channel (12) being in communicating relationship with said first region (1′) and said outlet side of said connecting channel (12) being in communicating relationship with said narrowest part of said venturi-tube (3) to thereby establish communication between said first region (1′) and said narrowest part of said venturi-tube (3) with flow of said ozone bearing gas from said first region (1′) to said narrowest part of said venturi-tube (3), said venturi-tube (3) dispersing and mixing said ozone bearing gas in said fluid for flow downwardly through said flow channel of said second region (1″), said second region (1″) having a lower end from which the mixed fluid and ozone bearing gas exits, said lower end of said second region (1″) and said phase separating element (13) being in communicating relationship, said phase separating element (13) separating said fluid from the mixture, said oxygen bearing gas entering said heat exchanger (6), said heat exchanger (6) and separating element (13) being in communicating relationship, said fluid separated by said separating element (13) flowing to and through said heat exchanger (6) to cool same and thereby to cool the oxygen bearing gas entering the heat exchanger (6) and to condense water out of such oxygen bearing gas.

2. A device in accordance with claim 1, wherein said heat exchanger (6) is of double-pipe construction defining an inner pipe and an outer pipe and wherein said inner pipe of said heat exchanger (6) receives and guides the flow of the fluid therethrough.

3. A device in accordance with claim 1, wherein said second region (1″) of said ozonizer (1) has at least one insert piece to vary the fluid cross-section.

4. A device in accordance with claim 1, wherein the venturi-tube (3) effects such two-phase flow of the fluid and oxygen bearing gas, and wherein said second region (1″) of said ozonizer (1) has at least one redispersing means to redisperse flow the two-phase flow effected by the venturi-tube (3).

* * * * *